United States Patent [19]
Lichtman et al.

[11] Patent Number: 5,101,295
[45] Date of Patent: Mar. 31, 1992

[54] ROTATING SLIT APERTURE FOR SCANNING MICROSCOPY

[75] Inventors: Jeffrey W. Lichtman; Lew Thomas, both of St. Louis, Mo.

[73] Assignee: Washington University, St. Louis, Mo.

[21] Appl. No.: 427,761

[22] Filed: Oct. 26, 1989

Related U.S. Application Data

[63] Continuation-in-part of Ser. No. 243,354, Sep. 14, 1988, Pat. No. 4,884,887, which is a continuation-in-part of Ser. No. 120,641, Nov. 16, 1987, abandoned, which is a continuation-in-part of Ser. No. 100,468, Sep. 24, 1987, abandoned.

[51] Int. Cl.[5] .................... G02B 21/00; G02B 26/02
[52] U.S. Cl. .................................. 359/368; 359/235; 359/227
[58] Field of Search ............... 350/266, 273, 274, 507, 350/523, 527; 359/232

[56] References Cited

U.S. PATENT DOCUMENTS 3,517,980  6/1970  Petram et al. .................. 350/527
4,040,095  8/1977  Abrams ......................... 350/274

FOREIGN PATENT DOCUMENTS 225470  1/1969  U.S.S.R. ...................... 350/274

Primary Examiner—Bruce Y. Arnold
Assistant Examiner—James Phan
Attorney, Agent, or Firm—Rogers, Howell & Haferkamp

[57] ABSTRACT

An improved aperture for a scanning microscope as is used to mask either or both of the incident light and reflected light includes a plurality of continuous curvilinear slits spaced evenly about a common origin, each of which approximates an Archimedes' spiral emanating from the origin centered on the aperture. There are two embodiments of the invention disclosed, both of which have a true Archimedes' spiral to define the inner edge of the continuous slit. In a first embodiment, the outer edge is defined as having a constant proportional circumferential aperture distance from the inner spiral. In the second embodiment, the outer edge is defined as another Archimedes' spiral having a constant offset of minimum distance from the inner spiral. However, the outer edges of the two embodiments essentially merge in a physical sense after only several of the inner revolutions of the continuous slit so that the continuous slit of either embodiment provides an image having uniform masking and uniform resolution. An alternate to these embodiments has a slit with an imaginary centerline wherein each edge is a constant minimum distance from the centerline.

40 Claims, 2 Drawing Sheets

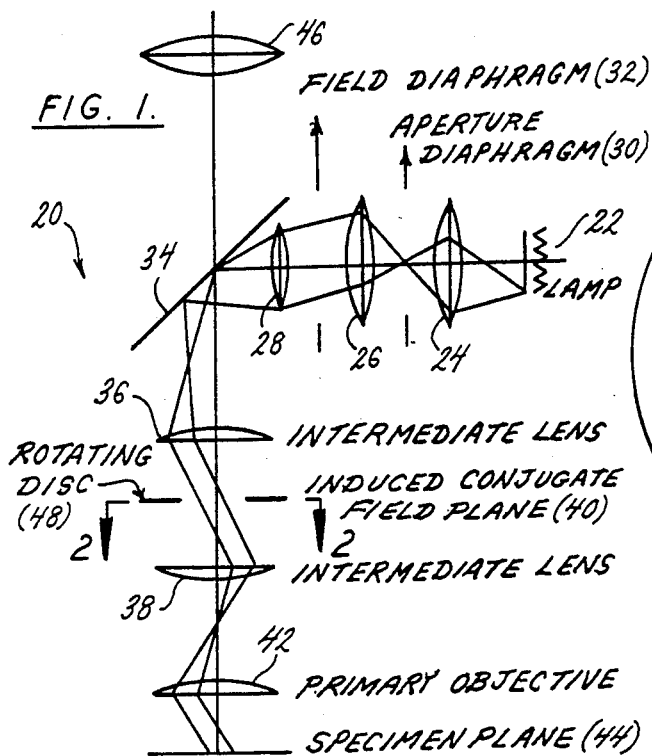
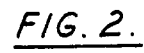
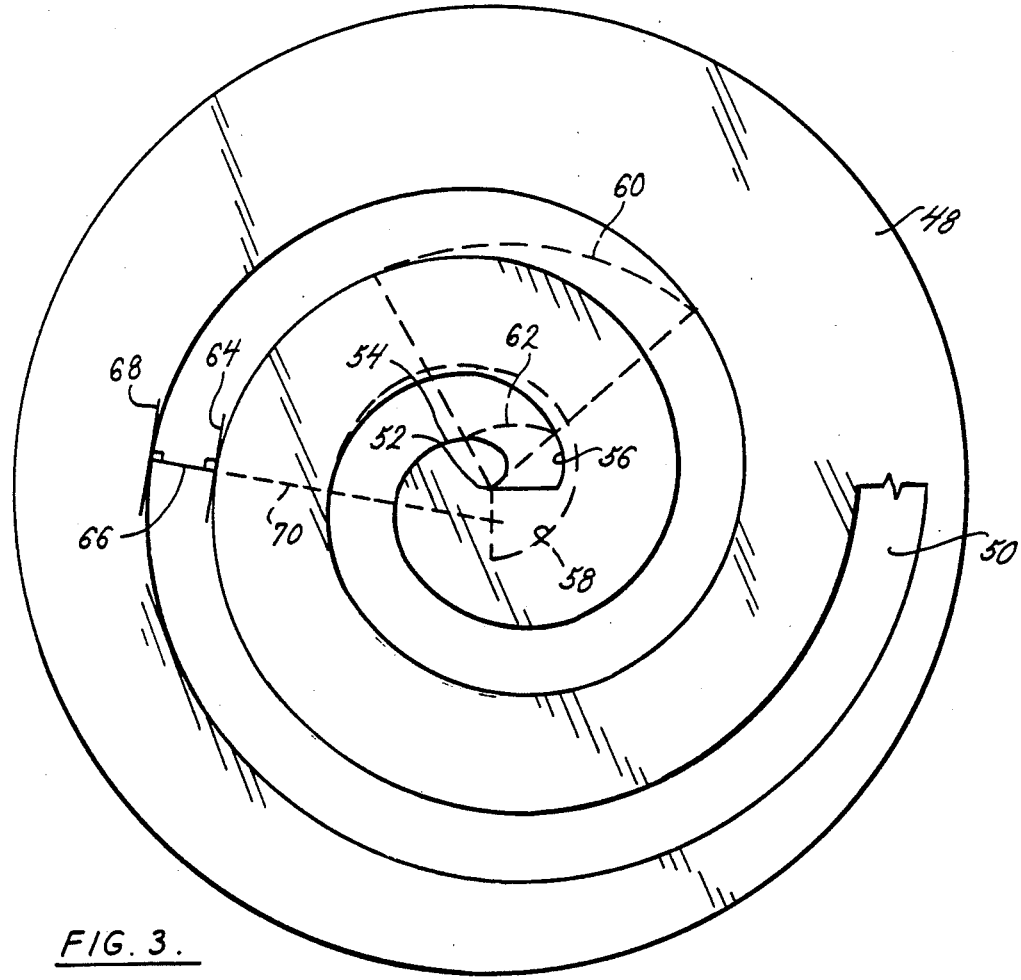

ROTATING SLIT APERTURE FOR SCANNING MICROSCOPY

BACKGROUND AND SUMMARY OF THE INVENTION

This application is a continuation-in-part of Ser. No. 07/243,354 filed Sept. 14, 1988 (now U.S. Pat. No. 4,884,887), which is a continuation-in-part of Ser. No. 07/120,641 filed Nov. 16, 1987 (abandoned Jul. 12, 1989), which is a continuation-in-part of Ser. No. 07/100,468 filed Sept. 24, 1987, now abandoned.

Scanning microscopy, including especially confocal scanning microscopy, is typified by an aperture which masks the incident light used to illuminate the specimen as well as the light returning from the specimen representative of the desired image. For purposes of clarity, the terms mask or masking will be used hereinafter and will be understood as referring to aperture effects in both the incident and return light paths. As is well known in the art of microscopy, enhanced contrast and resolution of an image may be obtained through scanning both the incident and reflected light. One of the inventors herein is also a co-inventor of the above-referenced patent applications which disclose and claim a new design for a confocal scanning microscope wherein a single aperture is used to scan both the incident and reflected light.

In the prior art, many different kinds of apertures have been proposed and used to achieve this scanning function in a confocal microscope. A widely used device is called a Nipkow disc which is typified by a series of small holes arranged in an Archimedes' spiral, with multiple spirals typically being contained in a single disc. Additionally, as most confocal scanning microscopes presently being used are of the tandem variety with a different light path for incident and reflected light, the Nipkow disc must contain matched pairs of spirals. As can be appreciated, it is difficult and, hence, expensive to accurately align and machine the large number of small holes generally contained in each Nipkow disc. For example, it is not uncommon for a Nipkow disc to contain 10,000 holes. As a result Nipkow discs can be quite expensive to manufacture and yet provide less than optimum performance due to potential misalignment of the holes at current manufacturing tolerances. Therefore, there exists in the art a need for a better aperture for use with a scanning microscope.

In considering the problem of an aperture for a scanning microscope, there are several conditions which must be met. One of these is that it is desirable to mask each portion of the specimen for the same fraction of scanning time in order to achieve a uniform masking across the entire specimen. If a specimen is subjected to uneven masking, then less information can be obtained from the image due to variations in brightness because contrast between light and dark areas of the specimen are important in analyzing the visual information derived from the specimen. A second condition is that each portion of the specimen be scanned through an opening which is equivalent in size to that used for scanning other portions of the specimen. It is a phenomenon of scanning microscopy that, generally speaking, the smaller the aperture, the more improved the image quality, providing greater detail (for example a narrower optical section or greater resolution) that is discernible to the viewer. A variation in the section thickness or resolution of the image data resulting from a variation in the size of the aperture used to scan various portions of the specimen renders an image of uneven quality which is less than desirable. Therefore, these two criteria, i.e. uniformity in the relative duration of mask time as well as uniformity in the size of the masked area, at every region of the specimen, are most important in considering an aperture for use in scanning microscopy.

For example, with a rotating pie-slice disc aperture whose center of rotation is at the apex of the wedge, the relative duration of masking at a point on the specimen is equal to that fractional portion of a circumference on the disc overlying the point which comprises the pie-slice. The resolving power for any aperture above any point on the specimen is proportional to the area being masked at any one instant. For the pie-slice disc aperture, this is related to the minimum distance between the pie-slice edges at the point of intersection of one such edge with the point of interest on tee specimen. For a slit aperture, the distance between the inner and outer edges of the slit along a circumference of a circle whose center is at the origin of rotation, i.e. the "circumferential aperture distance", when divided by the total circumference, determines the relative duration of masking. The resolving power of the slit aperture is related to the minimum distance between the inner and outer edges at every such point, i.e. the "minimum slit width".

Applying these criteria to a Nipkow disc, it can be appreciated that uniform masking is quite difficult to achieve because of the inherent difficulties in precisely aligning all of the holes to eliminate scan lines which would otherwise result from areas of over or under scanning of the image. In other words, the path that the holes mask across the specimen could either overlap or underlap thereby resulting in scan lines and areas of uneven masking. Still another example of a partial solution to the problem of achieving an optimal aperture is the rotating disc with one or more parallel radial slits of equal width. While this aperture does not produce scan lines, the relative duration of masking becomes progressively less in areas of the specimen scanned by progressively more radially distant areas of the disc, thereby resulting in uneven masking. This is because the percentage of time and area that is masked is proportional to the percentage of the circumference comprising the slit at a given radial distance of the disc. Still another possible aperture, which would eliminate uneven masking, is a pie-slice shaped slit or slits having a width which is proportional to the radius. With this pie-slice shaped aperture, the duration of masking is uniform throughout the specimen. However, the resolution of the image will vary as a function of the radial distance as the size or width of the "aperture" varies radially. In other words, the pie-slice shaped opening is narrower near the center of the disc than it is at the outer edges of the disc, such that greater "masking" takes place for parts of the specimen closer to the center of the disc. Similarly, the progressively more centrifugal parts of the specimen will be masked with progressively wider swaths of light because the slit has a greater minimum slit width and experience lesser "masking". Therefore, the pie-slice shaped aperture is not a satisfactory solution to the problem as it leads to uneven image resolution.

To solve these and other problems in the prior art, the inventors herein have succeeded in designing and developing an aperture for use in scanning microscopy which provides both uniform masking and uniform resolution as the aperture has an opening with a constant minimum width and a constant proportional circumferential aperture distance. This new aperture comprises a continuous slit which is generally formed in the shape of an Archimedes' spiral. More exactly, a first edge of the slit is indeed an Archimedes' spiral emanating from the origin or center of rotation of the disc while the second or outer edge of the slit may be more exactly defined in either one of two ways which form the two embodiments of the present invention. The inner edge of both embodiments has the formula of a typical Archimedes' spiral of:

$$r[i] = \frac{a}{\phi} \theta$$

This and other formulae herein are written in polar coordinates where r is the radius from the origin and $\theta$ is the angle in radians around the origin.

In the first embodiment, the outer edge of the slit is defined by the formula:

$$r[0, 1] = a + \frac{a}{\phi} \theta$$

where a=the distance along a radius centered at the origin between the two edges (typically in the range of 10–30 microns) and $\phi$=the angle subtended by the arc delineated by the intersection of any circular circumference (centered at the origin) with the two edges. In the second embodiment, the outer edge of the slit may be simply defined as that locus of points offset from the inner edge in a manner such that the distance "a" to the outer spiral is taken along a line perpendicular to the local tangent at every point on the inner spiral, each such perpendicular line being also perpendicular to the local tangent where it intersects the outer spiral. In this sense the width of the slit is constant throughout and the formula for the outer edge of the slit is:

$$r[0, 2] = a\theta \sqrt{\frac{1}{\phi^2} + \frac{2}{\phi\sqrt{1+\theta^2}} + \frac{1}{\theta^2}} = \frac{a}{\phi} \theta \sqrt{1 + \frac{\phi^2}{\theta^2} + \frac{2\phi}{\sqrt{1+\theta^2}}}$$

With edges defined by formulae of this type, it can be shown that within several full revolutions of the spirals, the optimal conditions are achieved for both minimum slit width and constant proportional circumferential aperture distance. The difference between the two embodiments is that for the first, the circumferential aperture distance is exact and proportionately constant throughout whereas the minimum slit width is slightly low at the center but rapidly approaches the optimum width within a few rotations of the spiral; and for the second embodiment the minimum slit width is exact and constant throughout whereas the proportional circumferential aperture distance is larger than desired at the very center but approaches ideal similarly rapidly in a few revolutions of the spiral. In the first embodiment for example, if a is equal to 10 microns and $\phi$ is equal to $$\frac{2\pi}{10} \text{ radians,}$$

then within $4\pi$ radians (two revolutions) the slit width is approximately 9.97 microns, only 0.03 microns from its limit value of 10 microns. Thus, within several revolutions, the slit has a minimum width which becomes negligibly different as a function of both radial and angular location, reaching a limit value of a. Similarly for the second embodiment, the proportional circumferential aperture distance is within 0.3% of its desired limit by the second revolution.

One difficulty with this approach, however, is that the rotating disc must be centered on the true center of the spirals. For example, an eccentricity of only 0.4 microns would produce a circumferential slit width error of ±2.5% using a single spiral with a=10 microns and $$\phi = \frac{2\pi}{10}.$$

Even if the disc were centered precisely, the tolerances of bearings ("play") might be plus or minus several microns. Furthermore, centralization of the spiral on the glass plate also will have some error, conceivably 10–80 microns. Thus, the single spiral design would be difficult at current manufacturing tolerances to implement successfully.

Calculations show, however, that the sensitivity to eccentricity can be reduced substantially by increasing the pitch of the spiral (e.g. from 100 microns/revolution to 2000 microns by decreasing $\phi$ from $$\frac{2\pi}{10} \text{ to } \frac{2\pi}{200} ).$$

With a 20 fold higher pitch a circumferential slit width error of ±2.5% now occurs when the spiral is eccentric by about 8 microns. With a 60 fold increase in pitch, a 23 micron eccentricity would produce the same circumferential slit width error. In order to restore the density of slits to the desired level while at the same time increasing the pitch, additional spirals of the same form would be added. These spirals would be phased appropriately in $\theta$. For example, 10 spiral apertures of pitch 1000 microns and phased every $$\frac{2\pi}{10} \text{ radians}$$

would restore the 100 micron spacing of aperture turns.

Calculations show that eccentricity of the spiral pattern manifests as phasic errors in circumferential slit width. Because of this, the addition of multiple spirals adds a second advantage: it reduces the sensitivity of eccentricity by allowing each spiral to help offset the errors of other spirals that are originating at different phases. For example, a two spiral pattern each having a pitch of 200 microns and 180° apart with respect to rotation about the geometric center of the aperture pattern would have eccentricity related errors that tend to cancel. Because the eccentricity induced oscillations in circumferential slit width are not symmetrical about the mean, the errors of the two spirals do not sum exactly to zero. Accordingly, there is a residual error "ripple" with a spatial frequency twice that of either spiral alone. In general, the ripple frequency for an N-spiral case is N times the frequency of the oscillations in circumferential slit width for any single spiral. Importantly, the amplitude of the errors in circumferential slit width decreases as the number of spirals increases.

Computer simulations show that an aperture can be designed which has minimal error given a particular eccentricity offset. In fact, if one expects a pattern with 12 bits of precision (error <1/4096), assuming that the inside diameter of the spiral pattern is one inch and that the slit-edge locations can be manufactured to within ±0.25 microns (achievable with the methods used for integrated-circuit production), then there must be at least four but no more than nine spirals. With nine spirals an eccentricity offset of 70 microns still gives 12-bit precision. The reason for the upper bound on the number of spirals is that using more spirals forces early revolutions of the spirals (for which optimal conditions are not yet achieved) into the pattern out beyond the one-inch inner diameter, thereby degrading the achievable precision. By increasing the inside diameter of the spiral pattern, the upper bound on the number of spirals could be relaxed.

As can be appreciated, the continuous slit aperture of the present invention provides optimal performance in a confocal or other scanning microscope in that uniform masking is achieved across the entire specimen as the circumferential slit aperture is a constant percentage of the circumference taken at any point on on the specimen while a uniform resolution of image is also attained as the minimum slit width is substantially constant after more than just a very few of the first revolutions of the slit about the origin. Thus, if these inner revolutions are not used to scan the specimen, substantially uniform masking and uniform image resolution are achieved with the continuous slit aperture of the present invention. The result is spatially uniform image intensity and resolution, both of which are critical to the extraction of quantitative information from the images.

While the principal advantages and features of the present invention have been explained above, a greater understanding of the invention may be attained by referring to the drawing and detailed description of the preferred embodiment which follow.

BRIEF DESCRIPTION OF THE DRAWINGS

FIG. 1 is a diagramatic view of a confocal scanning microscope and detailing the optics and positioning of the aperture of the present invention therewith;

FIG. 2 is an enlarged plan view of a disc aperture of the present invention;

FIG. 3 is a graphical representation detailing the different shapes for the two embodiments of the continuous slit aperture of the present invention.

DETAILED DESCRIPTION OF THE PREFERRED EMBODIMENT

Figure 4:
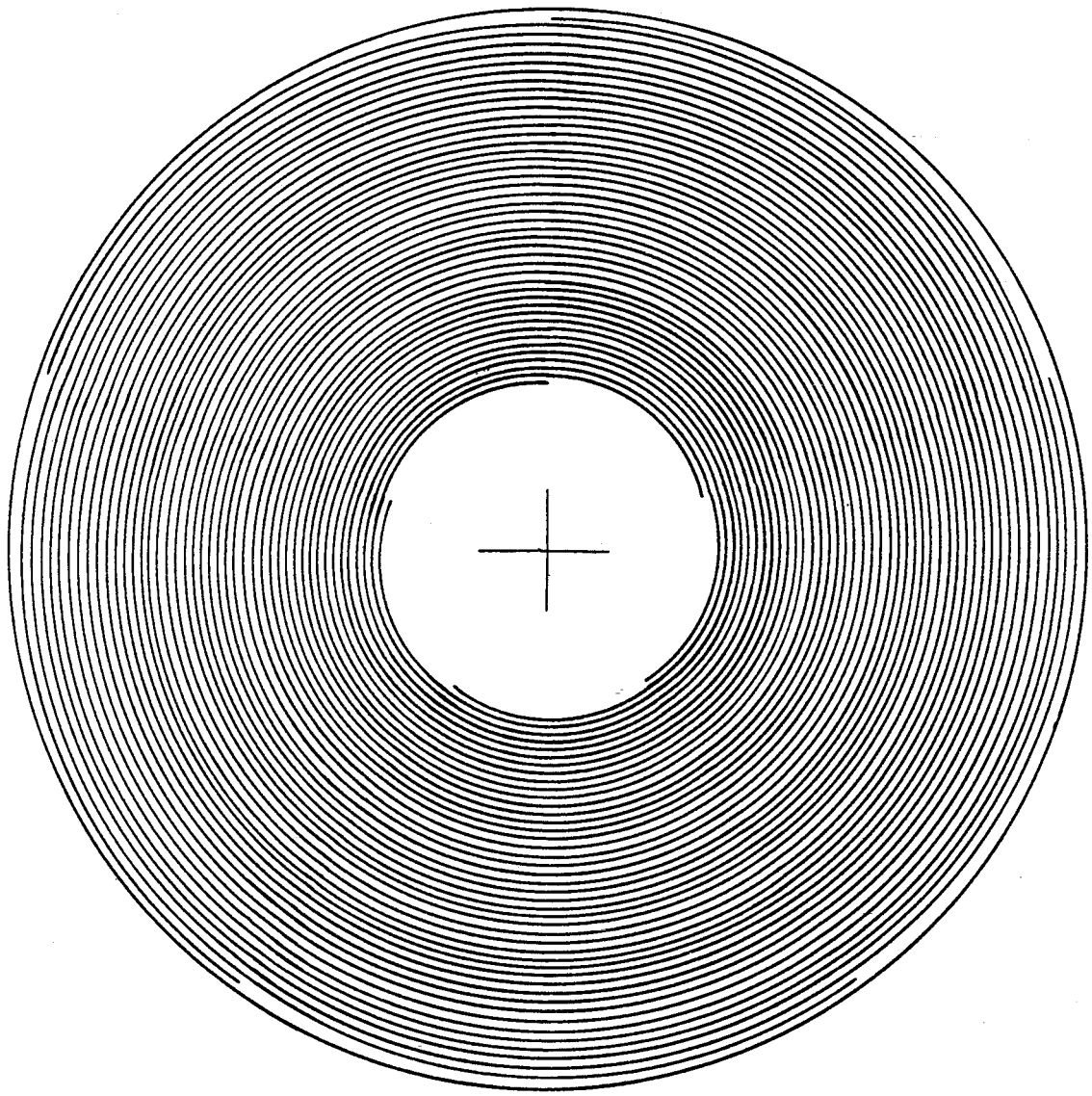
FIG. 4 is a graphical representation detailing an embodiment having five continuous slits.

The optics of a confocal scanning microscope 20 are shown in FIG. 1 and includes a light source or lamp 22 with three lenses, 24, 26, 28 surrounding an aperture diaphragm 30 and field diaphragm 32 as is typically included in a Kohler light source for creating properly collimated light for a confocal scanning microscope. A beam splitter 34 then reflects the light through a pair of matched objective lenses 36, 38 which create a conjugate field plane 40 therebetween in both the incident and returning light paths. A final objective 42 may then be used to focus the light at the specimen plane 44. Returning light traverses lenses 42, 38, 36 and passes through beam splitter 34 where it is focused by an eyepiece 46. This arrangement for a confocal scanning microscope 20 is the subject of one of the inventors' prior work as disclosed and claimed in the parent applications. With the confocal scanning microscope 20 as disclosed herein, the incident light path and returning light path are coincident such that a single aperture 48 may be placed at the conjugate field plane 40 to mask both incident and returning light with the same aperture. There are other types of confocal scanning microscopes which utilize different light paths for the incident and reflected light which therefore require an aperture having matched pairs of holes such as might be found in a Nipkow disc or the like. For purposes of the present explanation, however, the inventors will explain their improved aperture 48 as it might be used with a confocal scanning microscope having the same light path for both incident and returning light. However, it is to be understood that an improved aperture 48 of the present invention may be easily adapted for use with a confocal or other scanning microscope having multiple light paths merely by replicating the improved aperture for masking in an aligned fashion in both light paths.

As is shown in greater detail in FIG. 2, the aperture 48 is generally comprised of a circular disc with a continuous slit 50 formed therein. Slit 50 emanates from the origin 52 or center part of the disc and takes the form, generally, of an Archimedes' spiral. In actual fact, there are two separate embodiments which are disclosed and which are mathematically explainable in different terms but which yield substantially the same results, especially if portions of the continuous slit 50 beyond the innermost several revolutions of the slit are used to mask the light. These two embodiments are best shown in FIG. 3. It would be understood by one of ordinary skill in the art that there are innumerable curves or spirals which could be used, with innumerable mathematical formulae, all of which would produce substantially the same results. One such example would be a spiral aperture for which the center of the aperture would be an Archimedes' spiral and the inner and outer edges would be parallel to the spiral center in the manner developed for the outer edge of the second embodiment described above. For that case the inner and outer edges of the spiral would be given by $$r[i] = \frac{a}{\phi} \theta \sqrt{1 + \frac{\phi^2}{\theta^2} - \frac{2\phi}{\sqrt{1 + \theta^2}}}$$

and $$r[0] = \frac{a}{\phi} \theta \sqrt{1 + \frac{\phi^2}{\theta^2} + \frac{2\phi}{\sqrt{1 + \theta^2}}},$$

respectively. This is, in effect, a variation on the second embodiment, but neither the inner edge nor the outer edge is a true Archimedes' spiral, although both closely approximate an Archimedes' spiral after a few revolutions of $\theta$.

Referring now to FIG. 3, a graphical representation of the continuous slit 50 is shown. Although only a single continuous slit is shown in FIG. 3, it should be understood that an aperture having multiple slits spaced evenly about the center provides a decreased sensitivity to eccentricities of rotation as might be caused by either misplacement or improper drilling of the center hole or "play" in the bearings supporting the rotating aperture. As can be seen in FIG. 3, a first or inner edge 54 emanates from the origin 52 and, for both embodiments, can be mathematically described as an Archimedes' spiral having the formula:

$$r[i] = \frac{a}{\phi} \theta$$

where a equals the distance along a radius centered at the origin 52 between the inner edge 54 and the outer edge 56; $\phi$ equals the angle subtended by the arc delineated by the intersection of any circular circumference (centered at the origin 52) with the two edges 54, 56; and r and $\theta$ are the coordinates in a polar coordinate system. The inventors have found that a value for a of approximately 10 microns and a value for $\phi$ of approximately $$\frac{2\pi}{10} \text{ radians}$$

has provided good results. The outer slit edge 56 is defined by the formula:

$$r[0, 1] = a + \frac{a}{\phi} \theta$$

With this first embodiment, where the outer edge 56 is defined as stated, there is a constant duration of masking (uniform masking) along all parts of the slit including the innermost turns thereof.

Still another way to define the outer edge 58 is as shown in the second embodiment as a locus of points separated from the inner edge 54 by a constant distance along each perpendicular to the local tangent drawn at each point on the inner spiral. Such perpendicular lines are also perpendicular at each local tangent at each intersecting point on the outer spiral. Mathematically, outer edge 58 of the second embodiment can be defined as:

$$r[0, 2] = \frac{a\theta}{\phi} \sqrt{1 + \frac{\phi^2}{\theta^2} + \frac{2\phi}{\sqrt{1 + \theta^2}}}$$

Care should be taken to consider that the minimum distance between any point on the inner edge and the outer edge is not strictly equal to the radial distance between any point on the inner edge and the outer edge.

To graphically explain the concepts of minimum slit width and proportional circumferential aperture distance, reference should be made to FIG. 3. As shown therein, a dotted line 60 is that portion of a circumference of a circle drawn about the origin 52 which intersects both the inner edge 54 and the outer edge 56, 58, and thereby represents the amount of time that any portion of the specimen lying thereunder is masked by the aperture 48. Thus, the dotted line 60 represents the circumferential aperture distance for those portions of the specimen lying along line 60. Similarly, a second dotted line 62 is also a portion of a circumference of a circle drawn about the origin 52 and represents the circumferential aperture distance for any portion of the specimen lying thereunder. With the aperture 48 of the present invention, the circumferences which would include the arcuate portions thereof 60, 62 would be concentric circles about the origin 52, thereby indicating that a constant proportional circumferential aperture distance, or uniform masking, is achieved with the aperture 48 of the present invention. In other words, arcs 60, 62 represent the same amount of time for masking with each revolution of aperture 48 and the specimen is therefore presented with a uniform masking regardless of its radial position on the aperture 48.

To further graphically explain the concept of minimum slit width, a tangent line 64 has been drawn at a point on the inner edge 54 and a line 66 perpendicular thereto has been drawn which intersects the outer edge 56, 58 at which point a tangent line 68 has been drawn. With the aperture 48 of the present invention, tangent lines 64, 68 are parallel, and both tangent lines 64, 68 are perpendicular to line 66 which connects them. Thus, line 66 represents the minimum slit width between inner edge 54 and outer edge 56, 58. Furthermore, the minimum slit width 66 would be the same at any point along the slit 50, except for the first several revolutions thereof. Therefore, as any point on the specimen is masked, such as along lines 60, 62; the same "aperture width" is used despite the fact that portions of the specimen on line 62 are separated radially from those portions along line 60. Thus, this aperture 48 provides uniform resolution for any portion of the specimen, regardless of its radial position with respect to aperture 48. Note that line 66 does not project to the origin 52, as is shown by the dashed line 70. Accordingly, line 66 does not lie on a radius through the origin.

As can be seen by examining FIG. 3, the mathematical formula for the outer edge 56 of the first embodiment asymptotically approaches the outer edge 58 of the second embodiment but, strictly speaking, in a mathematical sense never reaches it. However, it can be mathematically shown that within $4\pi$ radians of revolution, the slit width of the first embodiment reaches a value of 9.97 microns which is only 0.03 microns less than the outer edge 58 of the second embodiment such that they become virtually coincident for any physical representation of the two embodiments. Thus, from an operational sense, the two embodiments merge after several revolutions of the continuous slit 50 such that if a portion of the continuous slit 50 beyond these inner revolutions is used to scan a specimen the results are indistinguishable.

In other words, at the innermost portion of the continuous slit 50, the first embodiment having outer edge 56 provides an image with a constant duration of masking or constant proportional circumferential aperture distance while the second embodiment having outer edge 58 provides an image having a constant minimum slit width or uniform resolution. After several revolutions of these two embodiments, they virtually coincide in the physical world such that the continuous slit 50 when used to scan a specimen will provide an image having both attributes of uniform masking and uniform resolution. Thus, as the aperture 48 is rotated, the continuous slit 50 permits light to either shine on the specimen or reflect from the specimen, or both as with the microscope disclosed herein, such that an improved confocal image is produced.

At the present time, the inventors herein are still experimenting with various ways of making the improved aperture 48 of the present invention. Good results have been obtained by plating an optical flat of glass with a layer of metal, such as anodized aluminum, and then photoetching the layer with an appropriate mask. The mask is made by photographing a computer generated image. Thus, in a physical sense, the aperture 48 of the present invention comprises an optical flat of glass which provides excellent rigidity to enhance the manufacturability of the aperture at the close tolerances required at the dimensions sought to be attained. However, other techniques might be utilized to manufacture an aperture of the present invention.

As explained earlier herein, for the inventors' present application an aperture comprised of between four and nine spirals spaced equally about a central origin provides 12-bit precision even with an eccentricity offset approaching 70 microns. Therefore, multiple spirals are desirable in decreasing the aperture's sensitivity to manufacturing and operational tolerances. A graphical representation of an embodiment with five spirals arranged symmetrically about the origin is shown in FIG. 4.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a scanning microscope having an incident light path and a returning light path for creating an image representative of at least a portion of a specimen, the improvement comprising an improved aperture for masking the light in at least one of said light paths, said aperture including at least one continuous slit substantially in the shape of an Archimedes' spiral centered about an origin.

2. The microscope of claim 1 wherein the minimum slit width of said slit is substantially constant for that portion of the slit greater than about two revolutions of the spiral about the origin.

3. The microscope of claim 2 wherein the minimum slit width of the slit asymptotically approaches a constant as the spiral advances from the origin.

4. The microscope of claim 2 wherein the minimum slit width of the slit is substantially constant for substantially the entire slit.

5. The microscope of claim 1 wherein the proportional circumferential aperture distance of the slit is substantially constant.

6. The microscope of claim 1 wherein a first edge of the slit is substantially defined by an Archimedes' spiral centered about the origin.

7. The microscope of claim 6 wherein the second edge of the slit is substantially defined by an Archimedes' spiral plus a constant offset of minimum distance from said first edge.

8. The microscope of claim 7 wherein the first edge is defined by the equation:

$$r[i] = \frac{a}{\phi} \theta$$

and the second edge is defined by the equation:

$$r[0, 1] = a + \frac{a}{\phi} \theta$$

where a=the distance along a radius centered at the origin between the two edges, $\phi$=the angle subtended by the arc delineated by the intersection of any circular circumference (centered at the origin) with the two edges, r=the radial distance from the origin, and $\theta$=the angle in radians about the origin.

9. The microscope of claim 8 wherein a is substantially equal to 10 microns and $\phi$ is substantially equal to $$\frac{2\pi}{10} \text{ radians.}$$

10. The microscope of claim 1 wherein said aperture includes a plurality of said continuous slits.

11. The microscope of claim 10 wherein said aperture includes between four and nine of said continuous slits, said slits having a common center at the origin and spaced substantially evenly about the origin.

12. The microscope of claim 1 wherein the slit has an imaginary centerline defined by an Archimedes' spiral, and each edge is defined as a locus of points substantially the minimum distance "a" from the centerline, "a" being a constant.

13. In a scanning microscope having an incident light path and a returning light path for creating an image representative of at least a portion of a specimen, the improvement comprising an improved aperture for masking the light in at least one of said light paths as it is rotated, said aperture including at least one continuous curvilinear slit having a radially inner edge and a radially outer edge centered about an origin, the inner edge being a curvilinear function other than a portion of a circular circumference about said origin, said outer edge being defined as a locus of points substantially the same proportional circumferential aperture distance from the inner edge.

14. The microscope of claim 13 wherein said aperture includes plurality of slits.

15. The microscope of claim 14 wherein said aperture includes between about four and nine of said slits.

16. The microscope of claim 14 wherein at least one edge of each slit may be approximated by at least a portion of an Archimedes' spiral.

17. The microscope of claim 16 wherein said at least one edge is the radially inner edge.

18. In a scanning microscope having an incident light path and a returning light path for creating an image representative of at least a portion of a specimen, the improvement comprising an improved aperture for masking the light in at least one of said light paths as it is rotated, said aperture including at least one continuous curvilinear slit having a radially inner edge and a radially outer edge centered about an origin, the inner edge being a curvilinear function other than a portion of a circular circumference about said origin, said outer edge being defined as a locus of points substantially the minimum distance "a" from the inner edge, "a" being a constant.

19. The microscope of claim 18 wherein said aperture includes a plurality of slits.

20. The microscope of claim 19 wherein said aperture includes between about four and nine of said slits.

21. The microscope of claim 19 wherein at least one edge of each slit may be approximated by at least a portion of an Archimedes' spiral.

22. The aperture of claim 21 wherein said at least one edge is the radially inner edge.

23. In a scanning microscope having an incident light path and a returning light path for creating an image representative of at least a portion of a specimen, the improvement comprising an improved aperture for masking the light in at least one of said light paths, said aperture including at least one continuous substantially spiral slit.

24. The microscope of claim 23 wherein said aperture includes a plurality of said slits.

25. The microscope of claim 24 wherein each of said slits is centered about a common origin, said origin defining a center of rotation of said aperture.

26. The microscope of claim 24 wherein each of said slits is continuous for that portion thereof which is aligned for masking of light for creating said image of said portion of said specimen.

27. The microscope of claim 26 wherein each of said slits is continuous throughout its length.

28. The microscope of claim 23 wherein said slit is continuous for that portion thereof which is aligned for masking of light for creating said image of said portion of said specimen.

29. The microscope of claim 28 wherein said slit is continuous throughout its length.

30. In a scanning microscope having an incident light path and a returning light path for creating an image representative of at least a portion of a specimen, the improvement comprising an improved aperture for masking light in at least one of said light paths as it is rotated, said aperture including a plurality of slits having means for substantially uniformly masking all parts of said portion with a substantially constant opening for a substantially equivalent percentage of time to thereby produce an image of substantially uniform masking and substantially uniform resolution, each of said slits being substantially in the shape of an Archimedes spiral, said slits having means for scanning said portion without producing scan lines in the resultant image, and each of said slits being continuous for that portion thereof which is aligned for masking of light for creating said image of said portion of said specimen.

31. In a scanning microscope having an incident light path and a returning light path for creating an image representative of at least a portion of a specimen, the improvement comprising an improved aperture for masking light in at least one of said light paths as it is rotated, said aperture including a plurality of slits having means for substantially uniformly masking all parts of said portion with a substantially constant opening for a substantially equivalent percentage of time to thereby produce an image of substantially uniform masking and substantially uniform resolution, said slits being sized to mask the specimen approximately 10% of the time.

32. An aperture for a confocal scanning microscope, said microscope having an incident light path and a returning light path for creating an image representative of at least a portion of a specimen, said aperture including at least one continuous slit substantially in the shape of an Archimedes spiral centered about an origin.

33. An aperture for a confocal scanning microscope, said microscope having an incident light path and a returning light path for creating an image representative of at least a portion of a specimen, said aperture including at least one continuous curvilinear slit having a radially inner edge and a radially outer edge centered about an origin, the inner edge being a curvilinear function other than a portion of a circular circumference about said origin, said outer edge being defined as a locus of points substantially the same proportional circumferential aperture distance from the inner edge.

34. An aperture for a confocal scanning microscope, said microscope having an incident light path and a returning light path creating an image representative of at least a portion of a specimen, the aperture including at least one continuous curvilinear slit having a radially inner edge and a radially outer edge centered about an origin, the inner edge being a curvilinear function other than a portion of a circular circumference about said origin, said outer edge being defined as a locus of points substantially the minimum distance "a" from the inner edge, "a" being a constant.

35. An aperture for a scanning microscope, said microscope having an incident light path and a returning light path for creating an image representative of at least a portion of a specimen, said aperture including at least one continuous substantially spiral slit.

36. The aperture of claim 35 wherein said aperture includes a plurality of said slits.

37. The aperture of claim 36 wherein each of said slits is continuous for that portion thereof which is aligned for masking of light for creating said image of said portion of said specimen.

38. The aperture of claim 37 wherein each of said slits is continuous throughout its length.

39. The aperture of claim 35 wherein said slit is continuous for that portion thereof which is aligned for masking of light for creating said image of said portion of said specimen.

40. The aperture of claim 39 wherein said slit is continuous throughout its length.

* * * * *